United States Patent [19]

Hicks

[11] 4,300,088
[45] Nov. 10, 1981

[54] ELECTRIC CHARGING APPARATUS FOR GROUND VEHICLES

[76] Inventor: David E. Hicks, 5255 Bluestem Dr., Colorado Springs, Colo. 80917

[21] Appl. No.: 29,683

[22] Filed: Apr. 13, 1979

[51] Int. Cl.³ .............................. B60L 7/10; H02J 7/00
[52] U.S. Cl. ....................................... 320/61; 188/159; 322/80
[58] Field of Search .......................... 320/2, 47, 61, 62; 188/156, 159, 160; 180/65, 65 C, 65 F; 318/376, 382; 322/80; 290/14-16

[56] References Cited

U.S. PATENT DOCUMENTS

| | | | |
|---|---|---|---|
| 2,247,814 | 7/1941 | Lamborn | 290/16 X |
| 2,724,085 | 11/1955 | Charbonneau | 322/80 X |
| 3,171,505 | 3/1965 | Imelmann | 188/159 X |
| 3,530,356 | 9/1970 | Aronson | 320/61 |
| 3,792,742 | 2/1974 | Mager | 320/61 X |
| 3,899,041 | 8/1975 | Mager | 318/382 X |

*Primary Examiner*—Robert J. Hickey
*Attorney, Agent, or Firm*—Richard W. Hanes

[57] ABSTRACT

An electrical generating system for land vehicles comprising an electrical generator operatively connected to the vehicle drive train, a battery and a system interconnecting the brake pedal to a switching arrangement which connects the generator output into the battery for charging purposes upon depression of the brake pedal and also provides for increasing the generator output as a function of brake pedal depression, thus utilizing the back EMF of the generator as a load on the drive train to assist in braking the vehicle and utilizing the momentum of the vehicle during braking to furnish energy to the generator.

2 Claims, 2 Drawing Figures

ELECTRIC CHARGING APPARATUS FOR GROUND VEHICLES

BACKGROUND OF THE INVENTION

Electrically powered vehicles have a great potential for saving fuel and reducing atmospheric pollution but thus far these potentials have not been realized in practical applications because of the high power requirements and short battery life of such vehicles. Electric vehicles have been unable to operate for more than a few hours without having to have their batteries recharged and, because of their power demands, the motors have had to be kept small to minimize current drain. Accordingly, with less power available, the speed and driving range of electric vehicles have prohibited their use on highways and have made them impractical as an all-around means of transportation.

SUMMARY OF THE INVENTION

The vehicular electrical generating system of the present invention involves the use of one or more high-power output electrical alternators operatively connected to the drive train of an automobile, bus or other land vehicle. Normally, during cruise or acceleration, the electrical output of the generator is disabled so as not to produce a "load" on the engine or associated drive train of the vehicle. The application of any force to the vehicle brake pedal or engagement of the braking system operatively engages an electrical power output control device which enables the generating unit to utilize the motion of the vehicle to turn the rotor of the generating unit and produce a high-power electrical output which is directed to the vehicle batteries for recharging purposes. The "back EMF" of the generator, which partially accounts for the load felt by any generator prime mover, increases as power is delivered by the generator unit, thus materially adding to the effective braking force being applied to stop or decelerate the vehicle.

Accordingly, the primary purpose of the present invention is to provide an electric generating system for ground vehicles which will produce sufficient power to self-charge the operating batteries of an electrically powered vehicle in order that such vehicle may operate independently of external battery charging sources.

A second and fundamental object of the invention is to provide electrical power for a ground vehicle which derives its energy from the momentum of the vehicle during braking deceleration, absorbing the energy of the moving vehicle in power generation instead of heat produced by brakes.

A further object of the invention is to provide an internal source of electrical power generation in a vehicle which produces no load to a cruising or accelerating engine, but becomes a load on the vehicle drive train during braking operations to assist with the deceleration of the vehicle.

A still further object of the present invention is to provide a novel source of electrical battery charging power for conventional internal combustion engine vehicles wherein the source of electrical power may be disconnected from the engine output, thus improving gasoline milage, and utilize the momentum of the vehicle during braking deceleration to provide the energy source for the electrical power generation.

Other and further objects, features and advantages of the present invention will become apparent upon a reading of the following detailed description of a preferred and secondary embodiment of the invention, taken in conjunction with the accompanying drawings in which.

DETAILED DESCRIPTION

Figure 1:
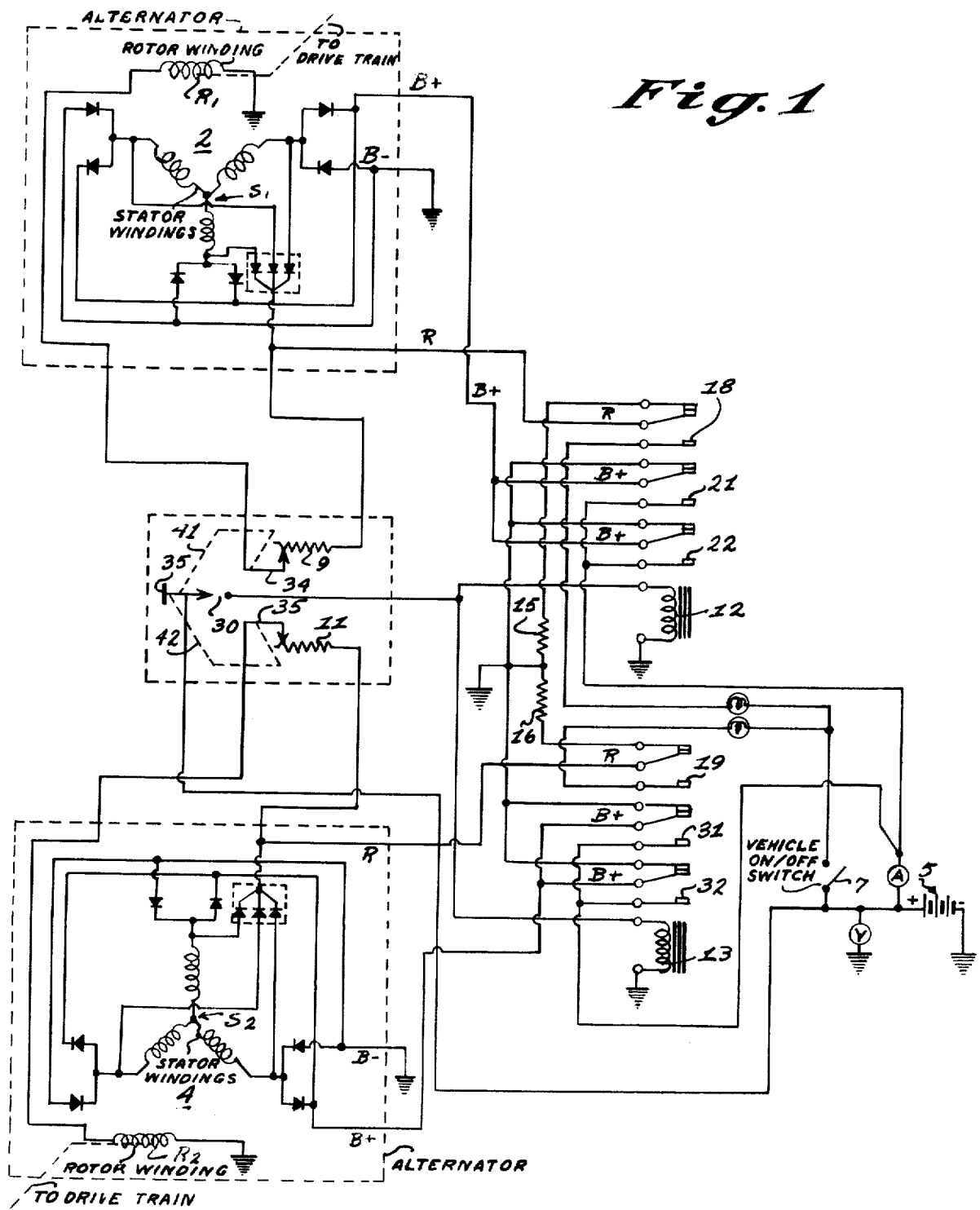
FIG. 1 is a schematic diagram of the present invention as would be applied to an electrically powered vehicle using two parallel connected alternators whose operation is activated by the vehicle brake pedal.

A preferred form of the system of the present invention is shown schematically in FIG. 1 as applied to an electrically powered vehicle. Two alternators 2 and 4 are connected by belt drive or similar system to the drive train of the vehicle. By "drive train," it is intended to mean that portion of the total drive train which is on the output side of the vehicle transmission, that is, directly connected to the wheels so as to be turned or driven any time the wheels are being turned. The mechanical connection of the rotor to the drive train is only diagramatically illustrated inasmuch as the mechanical connection per se is not part of the invention, it being within the state of the art. It should be noted that the connection preferably includes speed multiplying gearing or pulley arrangements to increase the rotational speed of the alternator rotors over the rotational speed of the drive shaft of the vehicle.

The alternators may be of any configuration where the output current is controlable over a range. The alternators shown in FIG. 1 are those of a type containing rotors $R_1$ and $R_2$ having poles formed by electromagnets whose excitation comes from the vehicle battery 5 connected in series through the vehicle on-off switch 7 and a set of normally open relay contacts 18 and 19. The alternators 2 and 4 include windings forming stators $S_1$ and $S_2$ whose terminals are connected to appropriate rectifiers through which is provided the D.C. output voltage B+. The alternators used in the present invention are not equipped with the normal state of the art voltage regulator system, but in place thereof, there is provided a variable resistence 9 and 11 for alternators 2 and 4, respectively.

In normal vehicle operation, the electrical output of the alternator stators is grounded through the normally closed contacts 21, 22 and 31, 32 of electromagnetic relays 12 and 13. Likewise, the rotor fields are grounded through bleed-off resistors 15 and 16, respectively. It is the object of the invention that when the brake pedal or brake system is activated, even to a very slight extent, the relays 12 and 13 are energized to pick up the relay contacts and provide field excitation for the alternators from the battery 5, through the vehicle on-off switch 7, and through the normally opened contacts 18 and 19 of relays 12 and 13 respectively. Picking up of the relays 12 and 13 also provides circuit continuity between the stator B+ outputs and the positive side of the battery 5 through the parallel connected normally open relay contacts 21, 22 and 31, 32 of the relays 12 and 13 respectively.

The coils or relays 12 and 13 are parallel connected to one terminal of a normally open switch 30. The switch 30 is mechanically connected to the brake pedal 35 and closes upon slight actuation of the brake pedal. When the switch 30 is closed, it provides circuit continuity between the relay coils directly to the positive side of the battery 5 and current flowing from the battery through the relay coils to ground energizes the coils and causes the relays 12 and 13 to pick up.

Also connected to the brake pedal by mechanical connections 41 and 42 are the wipers 34 and 35 of variable resistors 9 and 11, respectively. As the brake pedal is pushed downwardly, the resistence of the resistors 9 and 11 is decreased because of the travel of the wipers 34 and 35. As the resistence is decreased, the current output from the generators 2 and 4 respectively increases, providing full alternator output as the brake pedal is depressed to its extreme position. It is to be understood that the system herein described contemplates that the normal hydraulic brake system of the vehicle is primarily responsible for decelerating and stopping the vehicle, however the heavy current output of the alternators 2 and 4 to the battery 5 during deep brake pedal depression provides a high "back EMF" in the alternators and resulting load to the vehicle drive train so that significant braking is provided by the alternators, in addition to the braking provided by the vehicle brake system.

As the brake pedal is applied, the alternator output increases to a maximum output current and when the brake pedal is released and resistors 9 and 11 quickly increase the resistance in the rotor circuit, the output current of the alternator drops quickly.

Figure 2:
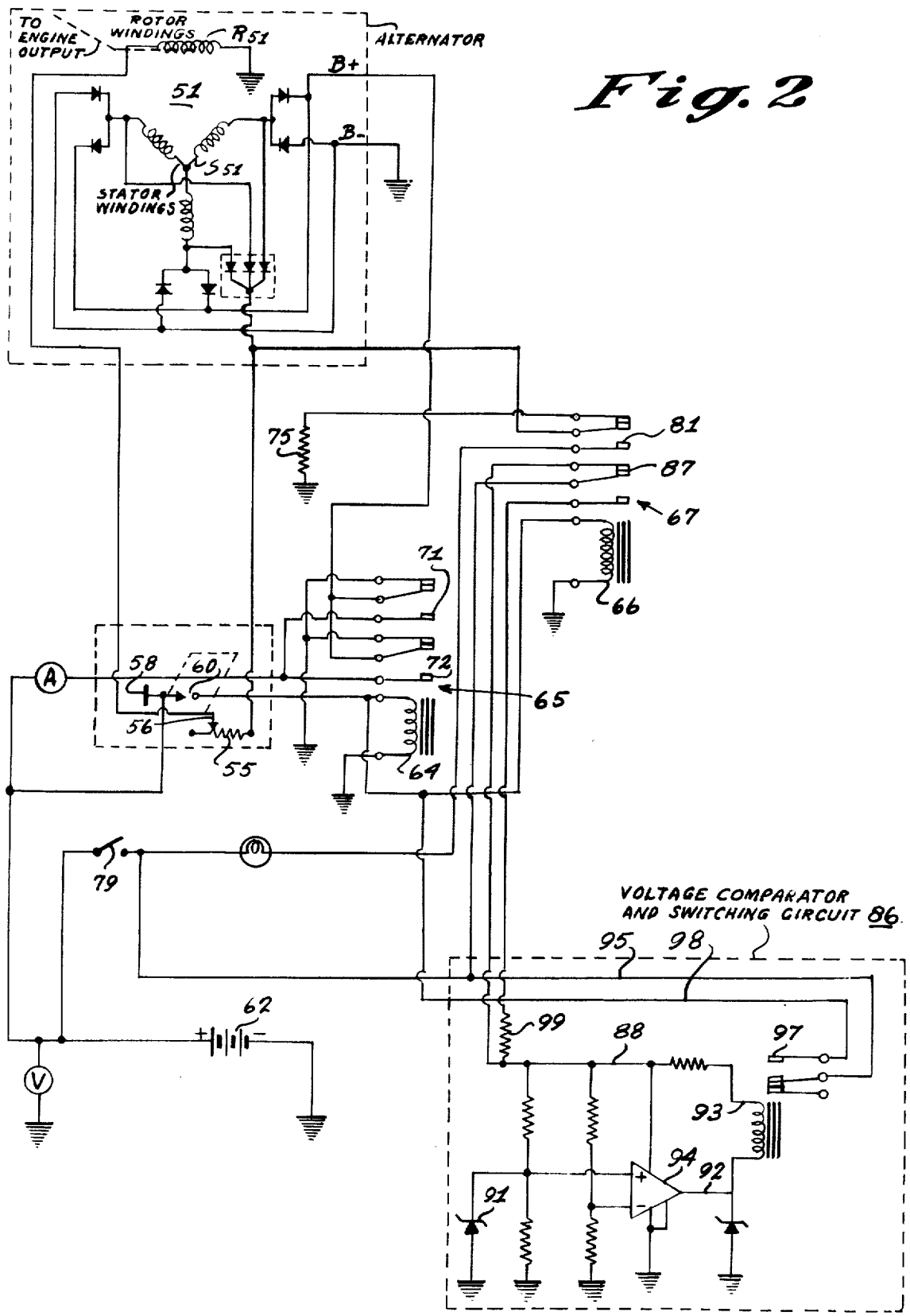
FIG. 2 is a schematic diagram of the present invention as applied to an internal combustion engine vehicle with a single alternator activated by the vehicle brake pedal to provide charging power to the vehicle battery.

FIG. 2 illustrates a second embodiment of the invention as applied to a vehicle equipped with a normal internal combustion engine and the customary battery, used for starting and the operation of the electrical loads, but not for powering the drive train of the vehicle, as in the first embodiment.

An alternator 51 is sized and designed for a lower output than the alternators in the electric car embodiment of FIG. 1. The normal voltage regulator is replaced with the variable resistor 55 connected in series with the rotor R51. The rotor is driven by a drive connection to the vehicle engine output. As with the preferred form, the wiper 56 of the resistor 55 is mechanically connected to the brake pedal 58 so that the further the pedal is depressed the less will be the resistance in series with the alternator rotor R51. Decreasing the resistance 55 allows the current to increase in the rotor which increases the electrical output of the stator winding S51. The pedal 58 is mechanically connected to a switch 60, electrically connected in series between the plus side of the vehicle battery 62 and the coils 64 and 66 of relays 65 and 67. Until the relays 65 and 67 are energized by depression of the pedal 58, the B+ output of the stator winding S51 is grounded through the normally closed contacts 71 and 72 of the relay 65. Similarly, the rotor is grounded through the normally closed contacts 81 of the relay 67 and a resistor 75.

Any downward movement of the pedal 58 closes the switch 60 and causes the relays 65 and 67 to be energized, providing circuit continuity from the battery 62 through ignition switch 79, normally open relay contact 81 and resistor 55 to energize the rotor R51 and produce a charging current to the battery 62 from the stator S51 through the normally open contacts 71 and 72 of the relay 65 and the current meter A.

When the alternator is put "on-line" by the energizing of the relays, the variable resistance 55 controls the output of the alternator as a function of the brake pedal position, the output increasing with deeper depression of the pedal. Downward motion of the brake pedal also activates the normal hydraulic vehicle braking system. In such an application, the electrical generating and charging system is operative only during braking operations so as to take advantage of the energy which is usually disseminated as heat in the brake system to produce electrical battery charging power. Operating economies are achieved because the alternator does not normally represent a load to the engine.

For highway driving when the brakes may be used infrequently, there is provided a special voltage comparator and switching circuit 86 which causes the relay coils 64 and 66 to be energized when the electrical system voltage drops below a predetermined level. The voltage output of the battery 62 is sensed through the normally closed contacts 87 of the relay 67 on line 88 when the ignition switch is on. The comparator 86 compares the system voltage against a fixed reference voltage established by the zener diode 91. When the battery voltage drops to 10 volts, the integrated circuit component 94 delivers a positive output voltage to line 92 which causes the comparator relay coil 93 to be deenergized. The relay 93 is normally energized by current flowing through the comparator circuit component 94 when the battery voltage is at the proper level. When the level drops, the voltage comparator circuit output 92 de-energizes the relay causing the current in line 95 to pass through the relay contacts 97 and onto line 98. The voltage on line 98 energizes the relay coils 64 and 66, causing the relays 65 and 67 to pick up. Thus, even though the brake pedal is not depressed, the alternator 51 will now deliver only a slight charge due to the fact that the full value of resistor 55 is still in series with the rotor R51. The value of the resistance 55 is not decreased until the brake pedal 58 is depressed. In this embodiment of this invention, the maximum value of resistor 55 is chosen so that some output can be obtained from the alternator when the relay coils 64 and 66 are energized, even though the brake pedal 58 is not depressed.

When relay 67 picks up, the sensing voltage is routed through the normally open side of relay contact 87 and through a voltage-dropping resistor 99 to the voltage comparator circuit 86. As soon as the charging system is activated, the battery voltage increases by a volt or more. Because of the sensitivity of the comparator circuit, this increase in voltage must not be "seen" on the sensing line and therefore the rerouting of the sensing voltage through the dropping resistor compensates for the increased voltage due to the charging action and provides the same level that would be obtained otherwise. With this circuit arrangement, the charging system is activated when the battery voltage drops to 10 volts and is deactivated when the voltage reaches 12.5 volts. As soon as the proper voltage level is reached, the comparator circuit de-energizes the relay coils 64 and 66, thereby causing the system to return to the previous brake-operated alternator control mode. Because the alternator output is so minimal during charging activated by the comparator circuit, the alternator load on the engine is negligible.

If the voltage comparator has command of the generating system at the time the brake pedal is depressed, the value of the resistor 55 will be reduced, thereby increasing the output of the alternator until the pedal is released. At that time, the voltage will again be sensed and the comparator circuit will activate the battery charging function of the system, providing the voltage is still below the desired level.

I claim:

1. An electrical generating system for land vehicles comprising:

generator means including first and second relatively rotatable electromagnetic windings;

electrical power storage means;

a vehicle drive train including operatively interconnected land contacting wheels and prime mover means;

means interconnecting the prime mover means and the first of said windings to produce rotation of said winding;

a manually operated lever means for producing braking action to the vehicle;

output control means electrically operative to control the output of the generator means, including means interconnecting the lever means and the output control means whereby the electrical output of the generator means increases with increased braking action; and means interconnecting the power storage means and the generator means.

2. The combination of claim 1 wherein the said means interconnecting the power storage means and the generator means includes first switching means at least responsive to operation of the said lever means and further including:

voltage comparator means including a source of reference voltage and having an input and an output and adapted to compare the power storage means voltage with the said reference voltage, second switching means connected to the output of the comparator means and operatively connected to the said first switching means whereby the first switching means is responsive to the operation of the second switching means; and means interconnecting the power storage means to the input of the comparator means.

* * * * *